(12) United States Patent
McNelis

(10) Patent No.: US 11,598,882 B2
(45) Date of Patent: Mar. 7, 2023

(54) SYSTEM AND METHOD FOR REMOTELY LOCATING OBJECTS (SEEKR)

(71) Applicant: John Ryan McNelis, Cupertino, CA (US)

(72) Inventor: John Ryan McNelis, Cupertino, CA (US)

( * ) Notice: Subject to any disclaimer, the term of this patent is extended or adjusted under 35 U.S.C. 154(b) by 115 days.

(21) Appl. No.: 17/356,436

(22) Filed: Jun. 23, 2021

(65) Prior Publication Data

US 2022/0003878 A1 Jan. 6, 2022

Related U.S. Application Data

(60) Provisional application No. 63/048,097, filed on Jul. 4, 2020.

(51) Int. Cl.
*G01S 19/25* (2010.01)
*G01S 19/51* (2010.01)
(Continued)

(52) U.S. Cl.
CPC .......... *G01S 19/252* (2013.01); *G01S 19/05* (2013.01); *G01S 19/51* (2013.01); *H04W 64/006* (2013.01)

(58) Field of Classification Search
CPC ....... H04W 4/02; H04W 4/029; H04W 64/00; H04W 4/80; H04W 4/33; H04W 64/006; G01S 19/252; G01S 19/05; G01S 19/51
See application file for complete search history.

(56) References Cited

U.S. PATENT DOCUMENTS

| 10,405,147 B1* | 9/2019 | Mahmoud | H04W 4/80 |
| 2009/0040101 A1* | 2/2009 | Ani | G06Q 10/08 |
| | | | 342/357.61 |

(Continued)

FOREIGN PATENT DOCUMENTS

| KR | 20130046659 A | * 10/2011 | |
| WO | WO-2013155386 A1 | * 10/2013 | ............. G01S 19/06 |
| WO | WO-2014120649 A1 | * 8/2014 | ......... G06K 7/10415 |

*Primary Examiner* — Dung Hong
(74) *Attorney, Agent, or Firm* — John T. McNelis

(57) ABSTRACT

This problem has been addressed before, but the way of doing so is flawed and incomplete. Only larger objects can be tracked, neglecting items such as glasses, TV remotes, and headphones. Some also solely use Bluetooth tracking, which can be quick and precise, but is unreliable. Items lost far away from people with Bluetooth active their phone cannot be found using this method. This is not an option for most small, easily misplaced items.

Various embodiments of the device (in one case using the name SeekR) allow for tracking of all these difficult-to-keep-track-of items. The device's small size allows it to attach to all of these items that existing solutions cannot, e.g., on the frame of glasses, e.g., the bridge, temple and/or temple tips. The device also incorporates assisted global positioning system (AGPS), which is much more reliable than tracking devices that solely use Bluetooth technology, and, in many cases, using AGPS results in identifying the location of a lost item faster than using Bluetooth (or other short distance wireless communication systems). The AGPS system used in various embodiments combines trilateration and global positioning system (GPS) technology to determine a more accurate device location in less time than using GPS systems alone.

20 Claims, 9 Drawing Sheets

(51) Int. Cl.
*G01S 19/05* (2010.01)
*H04W 64/00* (2009.01)

(56) References Cited

U.S. PATENT DOCUMENTS

| | | | |
|---|---|---|---|
| 2014/0106782 A1* | 4/2014 | Chitre ................... | H04W 4/021 |
| | | | 455/456.2 |
| 2018/0082565 A1* | 3/2018 | Braiman ................ | G08B 25/14 |
| 2020/0128482 A1* | 4/2020 | Daoura ................... | H04W 4/80 |

* cited by examiner

SYSTEM AND METHOD FOR REMOTELY LOCATING OBJECTS (SEEKR)

RELATED APPLICATIONS

This application claims priority from U.S. provisional application No. 63/048,097, titled System and Method for Remotely Locating Objects (SeekR), filed on Jul. 4, 2020, which is incorporated by reference herein in its entirety.

FIELD

The application relates generally to device tracking and more particularly to solar powered device trackers.

BACKGROUND

Many personal items are very easy to lose, prohibiting normal daily function until they are found. Keys and glasses are often required in order to drive a vehicle, so losing either one of them prevents someone from leaving his/her location until they have found the missing item. While phones are not truly necessary, they are near essential items for many people, as it is their source of entertainment, information, and comfort. There are many other items that, if misplaced, result in significant lost time when trying to locate, especially when searching for many items over the course of days and weeks. According to one study, the average person spends 60 hours per year looking for misplaced items.

SUMMARY

This problem has been addressed before, but the way of doing so is flawed and incomplete. Only larger objects can be tracked, neglecting items such as glasses, TV remotes, and headphones. Some also solely use Bluetooth tracking, which can be quick and precise, but is unreliable. Items lost far away from people with Bluetooth active their phone cannot be found using this method. This is not an option for most small, easily misplaced items.

Various embodiments of the device (in one case using the name SeekR) allow for tracking of all these difficult-to-keep-track-of items. The device's small size allows it to attach to all of these items that existing solutions cannot, e.g., on the frame of glasses, e.g., the bridge, temple and/or temple tips. The device also incorporates assisted global positioning system (AGPS), which is much more reliable than tracking devices that solely use Bluetooth technology, and, in many cases, using AGPS results in identifying the location of a lost item faster than using Bluetooth (or other short distance wireless communication systems). The AGPS system used in various embodiments combines trilateration and global positioning system (GPS) technology to determine a more accurate device location in less time than using GPS systems alone.

In one embodiment, a method for tracking a first object having an attached first tracking device comprising the steps of: receiving a request for a first location representing a location of the first tracking device; determining that the first tracking device is located inside a building (or more precisely within range of the three tower signals) when the first tracking device receives first, second and third tower signals that have signal strengths that are greater than a first threshold; determining that the first tracking device is located outside the building (or, more precisely, outside the range of the three tower signals—outside of tower range—for ease of discussion outside the building will be used herein but it correlates with outside of tower range) when the first tracking device does not receive first, second and third tower signals that have signal strengths that are not greater than the first threshold; determining the location of the first tracking device when the first tracking device is located inside the building having the steps of: receiving said first, second and third tower signals, determining the signal strength of said first, second and third tower signals, determining the location of the first tracking device using trilateration based upon the signal strength values of said first, second and third tower signals; and determining the location of the first tracking device when the first tracking device is located outside the building having the steps of: receiving AGPS signals; and determining the location of the first tracking device based upon the signal strength values of said AGPS signals. In one embodiment, if the first tracking device is within range of one or two tower signals that information can be provided to the user to assist the user in identifying the location. For example when receiving two tower signals with a strength above the threshold there are two possible locations where the tracker can be located, both of those locations can be shown to the user. Similarly if only one tower signal with a strength above the threshold is received then the circle upon which the tracker can be located can be displayed to the user.

In another embodiment, a first tracking device for tracking a first object comprising: a receiving unit for receiving a request for a first location representing a location of the first tracking device, said first tracking device attached to the first object; a location determining unit for determining that the first tracking device is located inside a building when the first tracking device receives first, second and third tower signals that are greater than a first threshold; determining that the first tracking device is located outside the building when the first tracking device does not receive first, second and third tower signals that are greater than the first threshold; determining the location of the first tracking device when the first tracking device is located inside the building having the steps of: receiving said first, second and third tower signals, determining the signal strength of said first, second and third tower signals, determining the location of the first tracking device using trilateration based upon the signal strength values of said first, second and third tower signals; and determining the location of the first tracking device when the first tracking device is located outside the building having the steps of: receiving AGPS signals; and determining the location of the first tracking device based upon the signal strength values of said AGPS signals.

DETAILED DESCRIPTION

Figure 1:
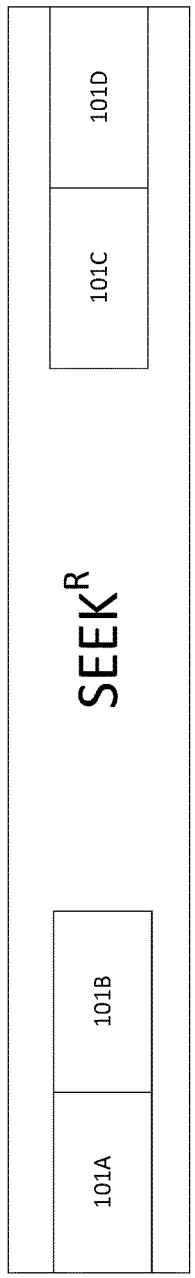
FIG. 1 is an illustration of a top view of the tracking device, according to one embodiment.

FIG. 1 is an illustration of a top view of the tracking device, according to one embodiment. The solar panels/cells 101A-D recharge the device. The cover for the circuit board 115 covers the internal components of the circuit board, providing a waterproof barrier for the electronics. The solar panels/cells 101 can also waterproof (including water resistant), allowing SeekR to still function on objects that are frequently submerged. The solar panels/cells can be conventional or can be designed to fit the specific shape of the tracker, e.g., an elongated shape such as shown in FIG. 1 to fit on thin surfaces, e.g., glasses.

In alternate embodiments, the tracker can fit in or on a person's shoes, clothes, hats, purse, etc. in order to maintain track of a person who may become lost, e.g., a child, a person suffering from dementia, a companion at a large event such as a concert. In some embodiments, the tracker will make a noise when searched for in order to alert the person that he/she is being monitored.

Figure 2:
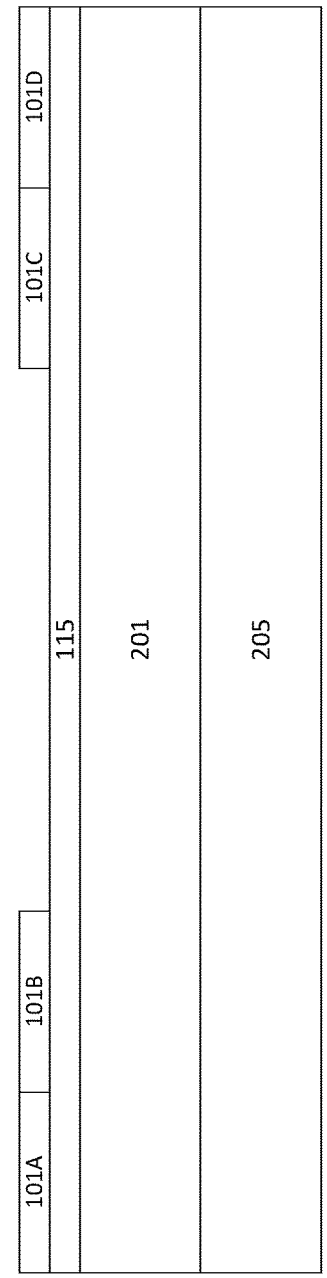
FIG. 2 is an illustration of a side view of the tracking device, according to one embodiment.

FIG. 2 is an illustration of a side view of the tracking device, according to one embodiment. The solar panels/cells 101, are present on top of the tracker where they can recharge the device. The circuit board components 201 are what the cover for the circuit board 115 is protecting. The circuit board components 201 are varied in size, but, in some embodiments, the cover for the circuit board 115 is at a uniform level. The printed circuit board (PCB) 205 is what the circuit board components 201 are resting upon. Together, these two components are the circuit board.

Figure 3:
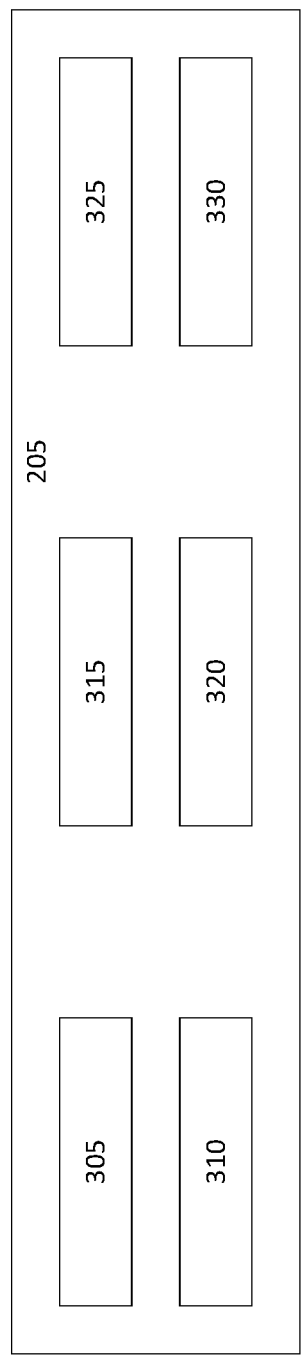
FIG. 3 is an illustration of the circuit board components, according to one embodiment.

FIG. 3 is an illustration of the circuit board components, according to one embodiment. The PCB 205 is positioned at the bottom of the figure and can support the remaining components. The memory 305 stores data and information, as well as instructions for the other parts of the circuit board to function properly. The processor 310 is the main chip responsible for processing instructions which is relaying to the other parts of the circuit board. The AGPS unit 315 is what allows for tracking to take place. Using a combination of trilateration and GPS, the AGPS unit is able to pinpoint the device's location very quickly. The battery 320 powers the device. In some embodiments, the batter is rechargeable and can be recharged by the solar panels 101. The signal strength detector 325 measures the signal strength of the signals received from the towers inside of a house. This allows for tracking the location using trilateration inside of the house as described in greater detail below. The receiver-transmitter 330 receives and/or transmits information from the tracker to the device tracking the lost item either directly or through a network. Components 305 through 330 are all a part of the circuit board components 201. It is understood that additional circuit board components may be present.

Figure 4A:
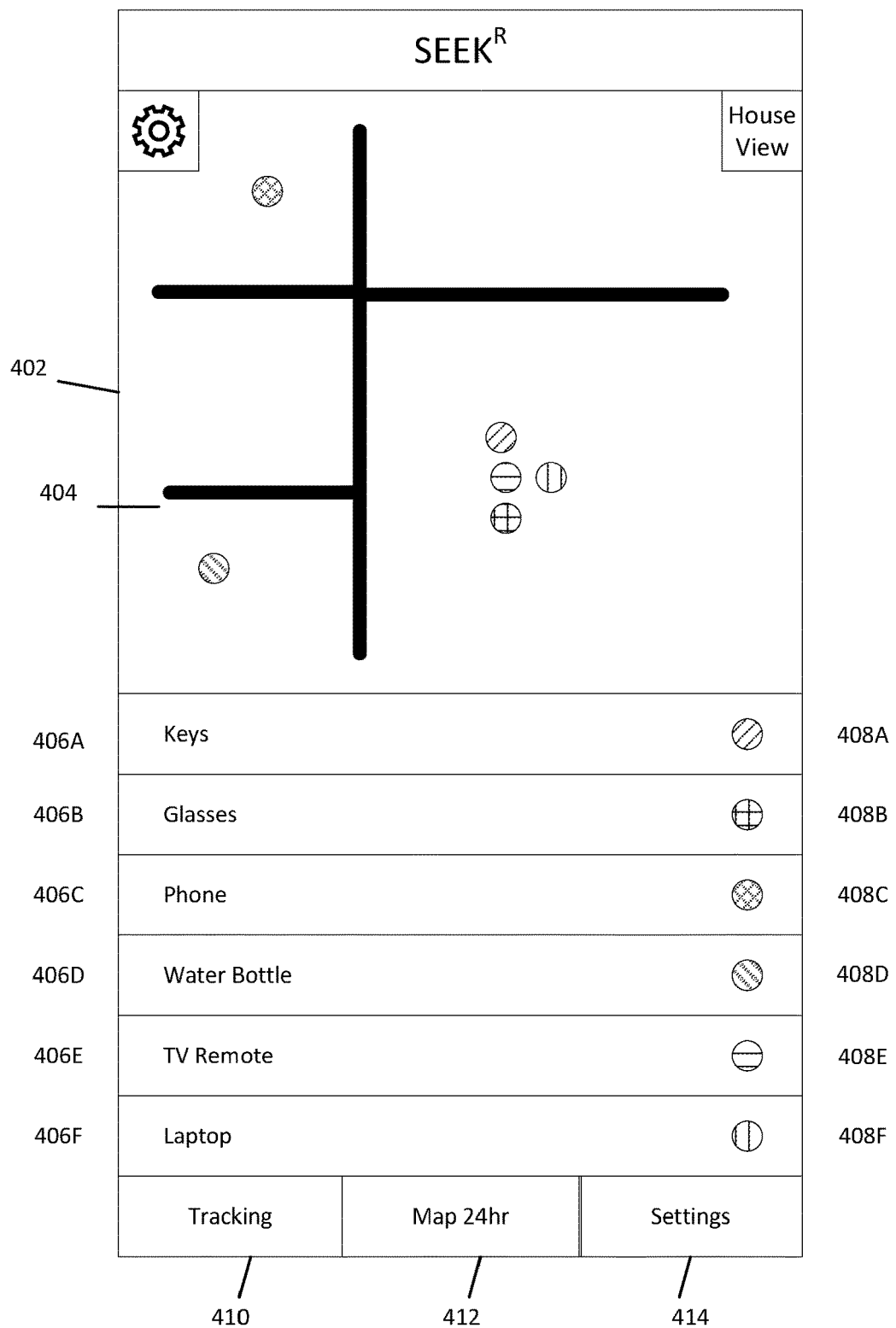
FIG. 4A is an illustration of the tracking screen of the app, in world view, according to one embodiment.

FIG. 4A is an illustration of the tracking screen of the app, in world view, according to one embodiment. FIG. 4A shows the tracking functionality of the world map. Each item appears as a different color or symbol 408A-F. In embodiments, each device can be tracked together, in some combination, and/or separately. The user has the option to only track one item to conserve battery life on the other devices. Clicking the settings button 414 brings the user to FIG. 4C. Clicking on the House View button brings the user to FIG. 4B. FIG. 4D is accessed by clicking on the Map 24 Hr button 412. FIG. 4E is accessed by pressing the name of one of the trackers 406A-F, that, in some embodiments, shows a drop-down menu of options for the tracker.

Figure 4B:
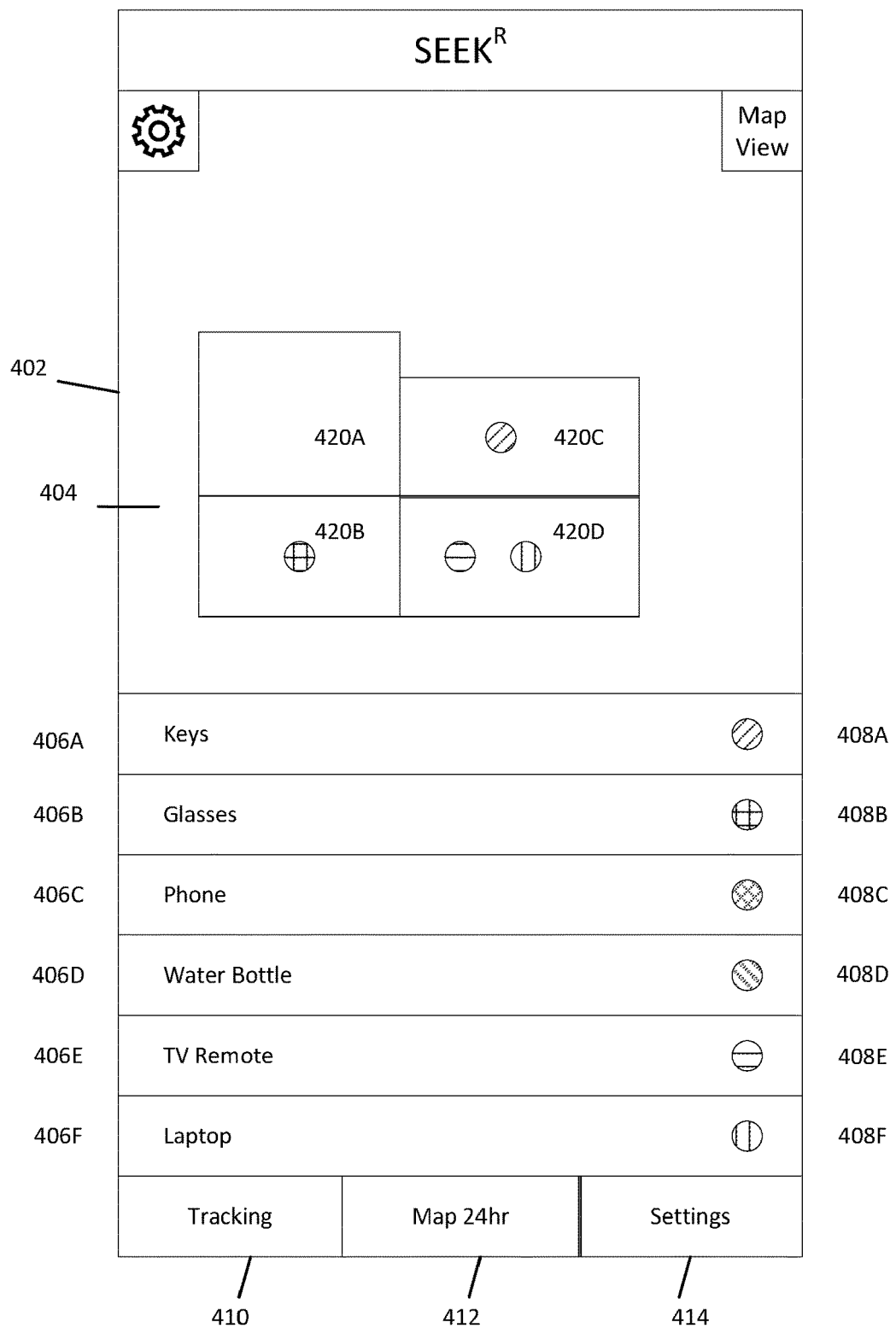
FIG. 4B is an illustration of the tracking screen of the app, in house view, according to one embodiment.

FIG. 4B is an illustration of the tracking screen of the app, in house view, according to one embodiment. FIG. 4B shows the tracking functionality of the House map. Each item appears as a different color or symbol 408A-F. In embodiments, each device can be tracked together, in some combination, and/or separately. The user has the option to only track one item to conserve battery life on the other devices. As described above with respect to FIG. 4A, clicking the settings button 414 brings the user to FIG. 4C. Clicking on the Map View button brings the user to FIG. 4A. FIG. 4D is accessed by clicking on the Map 24 Hr button 412. FIG. 4E is accessed by pressing the name of one of the trackers 406A-F, that, in some embodiments, shows a drop-down menu of options for the tracker.

Figure 4C:
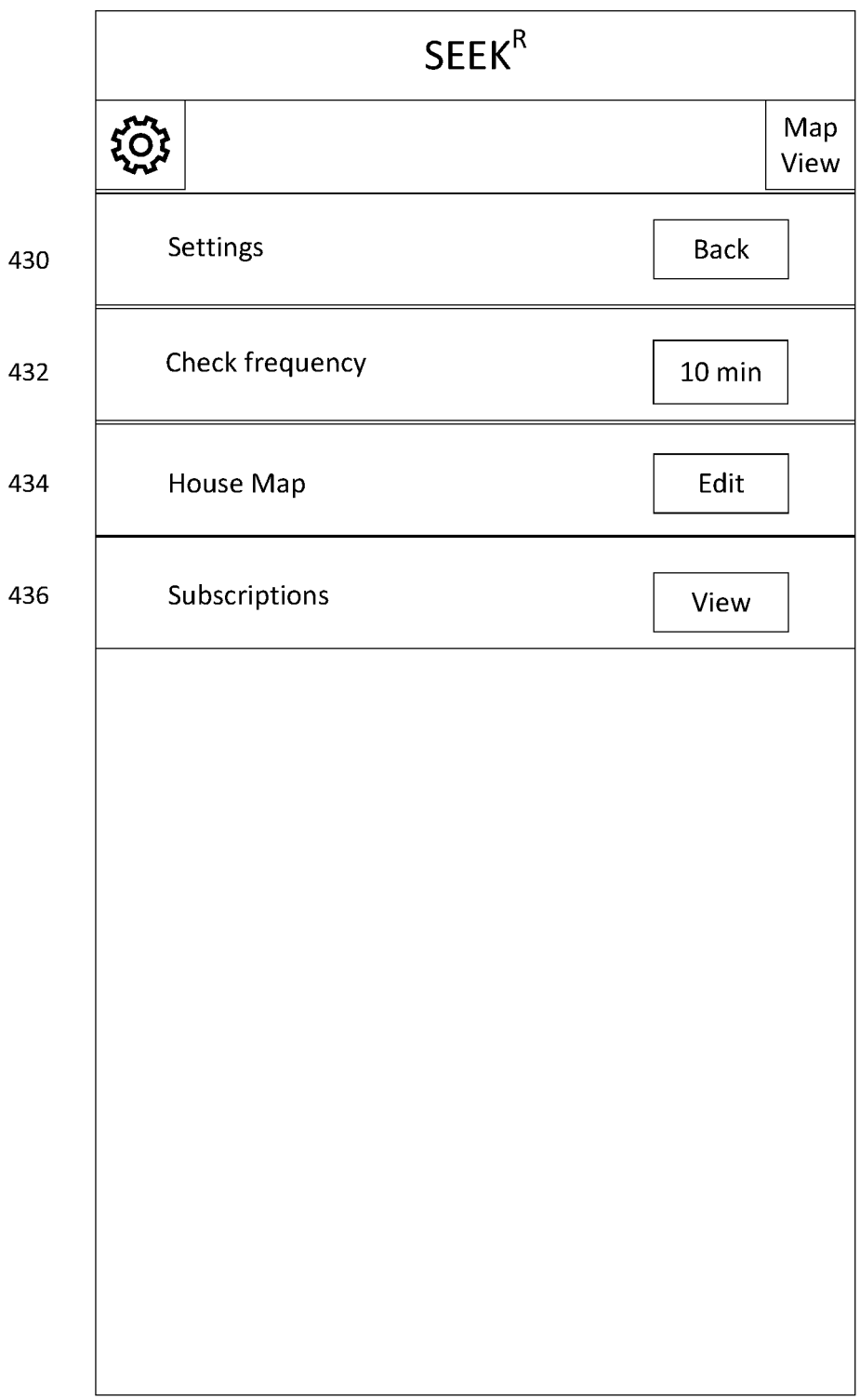
FIG. 4C is an illustration of the settings screen of the app, according to one embodiment.
Figure 4D:
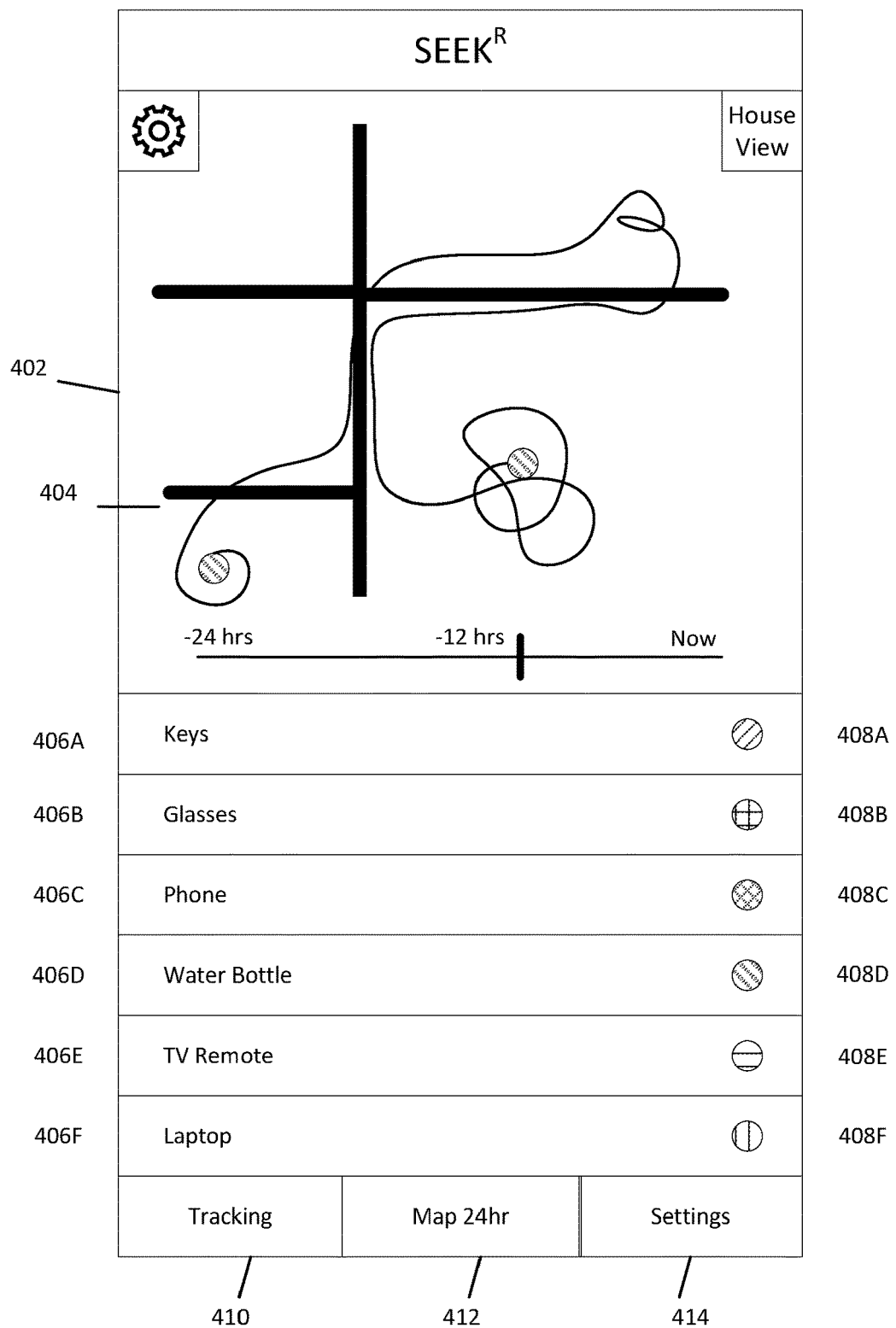
FIG. 4D is an illustration of the prior location screen of the app, according to one embodiment.
Figure 4E:
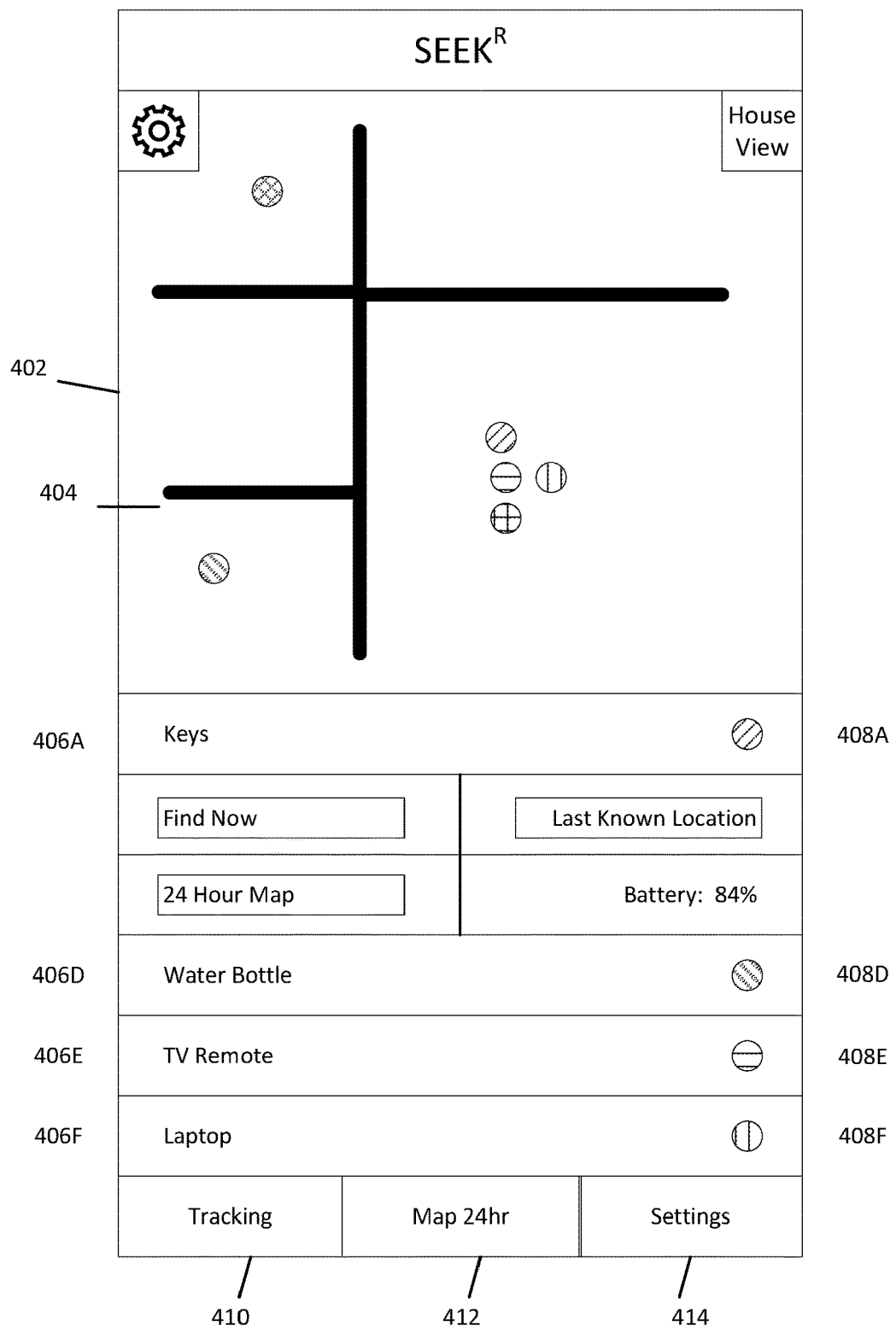
FIG. 4E is an illustration of the specific functions of the tracking scene, according to one embodiment.

FIG. 4C is an illustration of the settings screen of the app, according to one embodiment. After selecting the settings button 414 a display such as that shown in FIG. 4C appears on the user device, e.g., a phone, computer, watch, glasses, or computing device. FIG. 4C shows the settings including options to change how frequently the 24-hour map calls on each device, an option to edit the house map layout, and an option to manage subscriptions, for example. The back button takes the user back to the previous display that they were viewing.

FIG. 4D is an illustration of the prior location screen of the app, according to one embodiment. FIG. 4D shows a map of a trackers position for up to the past 24 hours. Several maps can be overlaid on each other, and the view can be toggled from world map to house map. A slider can also be enabled to show where the device was at a certain point. Pressing on the name of the tracker 406 switches the focus from one tracker to another FIG. 4E is an illustration of the specific functions of the tracking scene, according to one embodiment. FIG. 4E shows examples of specific functions that may be done for each tracker on the tracking scene. There is a button to prompt the tracking, labeled "find now" that calls to the tracker, e.g., transmits a signal to a tracker through a network or directly. The tracker, after receiving the signal receives and transmits location data, e.g., AGPS or trilateration data, to help identify its position in the world or in the house. There is also a button to show the tracker's last known location, in case the tracker is unable to detect its location, runs out of battery, or is taken offline. The battery charge percentage is also shown on this screen. The 24-hour map can be accessed through a button on this screen, taking the user to FIG. 4D. FIG. 4A can be accessed by pressing on the name of the item 406, retracting the menu. Clicking the settings button brings the user to FIG. 4C and clicking on the House View button brings the user to FIG. 4B.

Figure 5:
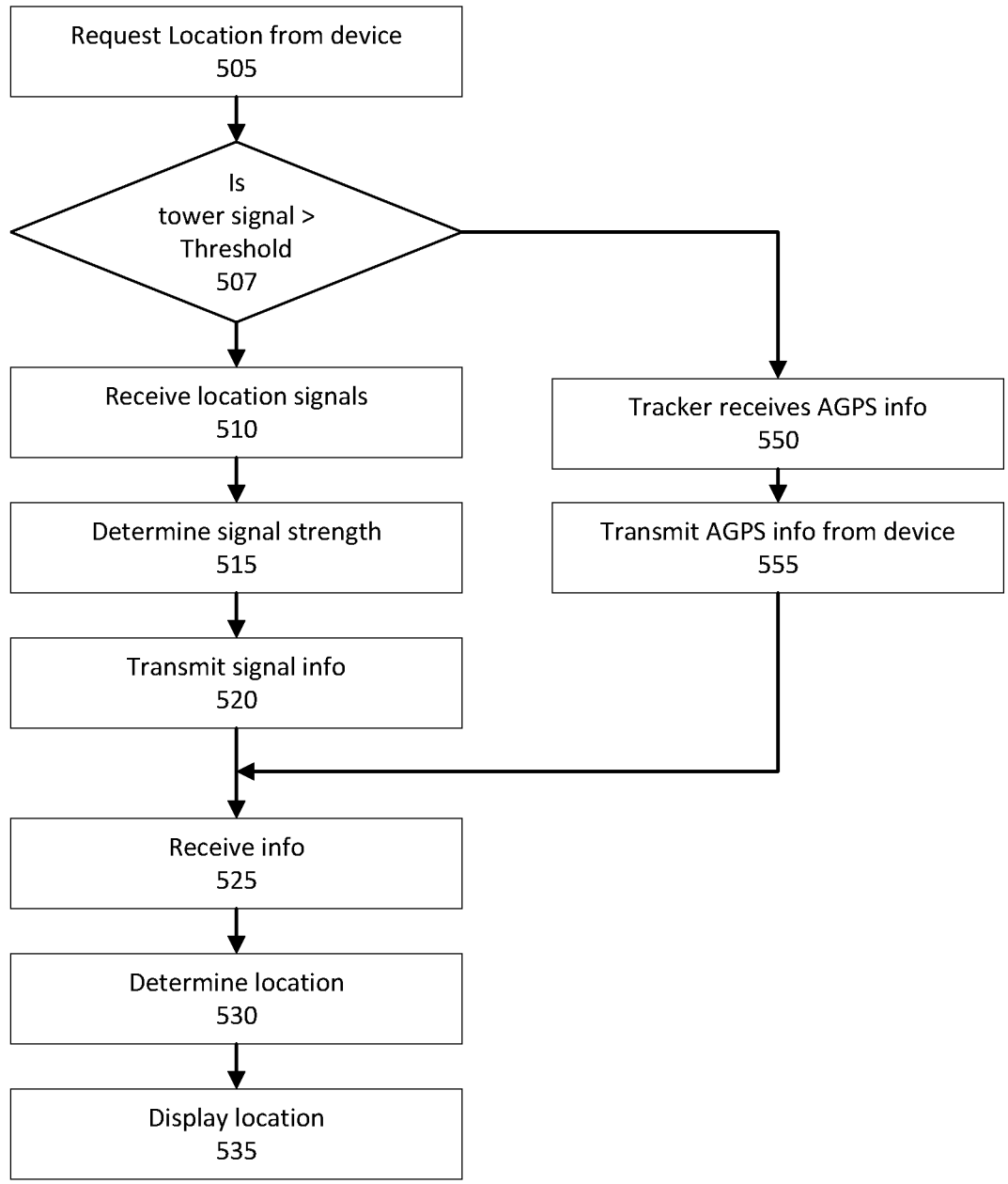
FIG. 5 is a flow chart showing the functional operation of the tracker according to one embodiment.

FIG. 5 is a flow chart showing the functional operation of the tracker according to one embodiment. In an embodiment, the user utilizes a device, e.g., a phone, opens the SeekR application (app) and requests the location 505 of an item on which a tracker is attached. This could be a button, or could be a process started by opening the app. The tracker can be attached to the item in any manner including adhesive, gravity, a pouch within the item or any other manner in which the tracker is securely positioned near or in the item so that it remains close to the item under normal circumstances. The device then checks to see if 507 the signal strength from the towers is above a certain threshold using the signal strength detector 325. If it is, then tower tracking is initiated. If not, then AGPS is used. In one embodiment, the device constantly checks to see if it receives a location request on the receiver/transmitter 330 In another embodiment the device periodically checks whether a location request has been received, for example the location request signal may be repeated for a first period of time, The first period of time can be, for example, one second, 10 seconds, 30 seconds, five minutes or another length which can be chosen to balance the battery life verses the delay of responding to a location request. The location request is transmitted using a wireless network, e.g., cellular, WiFi, Bluetooth, radio frequency identification (RFID). After receiving the location request the tracker determines whether it is receiving signals from a tower by determining if the tower signal(s) is/are lower than a first threshold. If the tower signal strength is lower than a threshold value 507, this means that the tracker is not close to the towers, e.g., it is not located in the home or that the tower is not properly operating. If the tracker is located in the home, the tracker starts with receiving signals 510, from the towers. Each tower has a signal identifier that is unique when compared to the other two towers. The identifier can be done in any conventional way, e.g., it may be a value encoded in the signal or the use of different signal frequencies. The tracker then determines signal strengths 515 from each of the towers. The signal strengths are then sent to the user device 520 or, in alternate embodiments, the signal strengths are sent to a cloud computing device to assist in computing the location, the location information may then be sent to the user device. The AGPS path follows a different order of operation. If the tower signal strength is lower than a threshold value 507, this means that the tracker is not close to the towers, e.g., it is not located in the home or that one or more of the towers is not operating correctly. In that case the tracker listens for and receives 550 AGPS signals. The AGPS data is then transmitted 555 to the user device. In alternate embodiments the AGPS data is sent to a cloud computing device via a network to assist in computing the location, the location information may then be sent to the user device. The user device then receives location information 525, where the user device then performs the calculations based on the trilateration/AGPS data to determine location 530, presuming the calculations are not done using another device, e.g., a cloud computing device, as described above. The app then displays 535 on the app the location of the device on which the tracker is attached.

As an example, if a person wants to find their lost glasses, they can first open the app on a user device, e.g., phone, and selects 505 the request location button 406 and then the "Find Now" button. The device then receives 510 a signal from the towers. The strength of these signals is then determined 515, and the device determines whether 507 the tracker is outside or inside a house (or other area near the towers) based on the towner signal strength. In this example, the signal strength is above a certain threshold, so the glasses are inside. Because it is inside, AGPS is not needed, so the signal strengths from the towers are sent 520 to the app on the user device (or via a cloud computing device). The app then receives this raw location information 525 and uses the raw location information to calculate 530 where the glasses are located 530. The location is then displayed on the app 535, as seen in FIG. 4B.

As another example, if someone wanted to view where their dog went over the last (or any) period of time, the user can select the 24-hour map view (in other embodiments any window of time is available). To accomplish this, the user opens the app and selects their dog's tracker, e.g., one of items 406. They can select the 24-hour map button and wait for the page to load. The app then displays a map of where the dog has been every 20 minutes for the past 24 hours. The 20 minutes interval can be changed, with more intervals giving a more accurate portrayal of the dog's movement, and fewer intervals increasing the battery life of the tracker. In some embodiments, if the 24-hour map function is turned on, then the tracker either performs the operation shown in FIG. 5, or a modified version of the process shown in FIG. 5 if the location determining interval information is stored on the tracker. If the location determining interval information is stored on the tracker then the at the proper time (based on the interval) the tracker performs starts by attempting to receive tower signals, then proceeds to step 507. The remaining process then continues although the location information is displayed 535 until the user requests the information.

Another example is if someone wants to find their lost water bottle. The user can open the app and selects 505 the request location button 406 and then the "Find Now" button. The device then receives a signal from the towers, 510. The strength of these signals is then determined 515, and the device determines 507 whether the tracker is outside or inside a house (or anywhere near where the towers are positioned) based on the tower signal strength. In this example, the signal strength is below a certain threshold, so the water bottle is outside. The process of determining whether the tracker is inside or outside can be done in a single step as determining whether the tower strength signals are above or below a threshold is done concurrently. Because of this, the tracker receives the AGPS signals 550, and transmits these signals to the device 555. The app then receives this information 525 and uses the information to calculate where the water bottle is located 530. The location is then displayed on the app 535, as seen in FIG. 4A.

Figure 6:
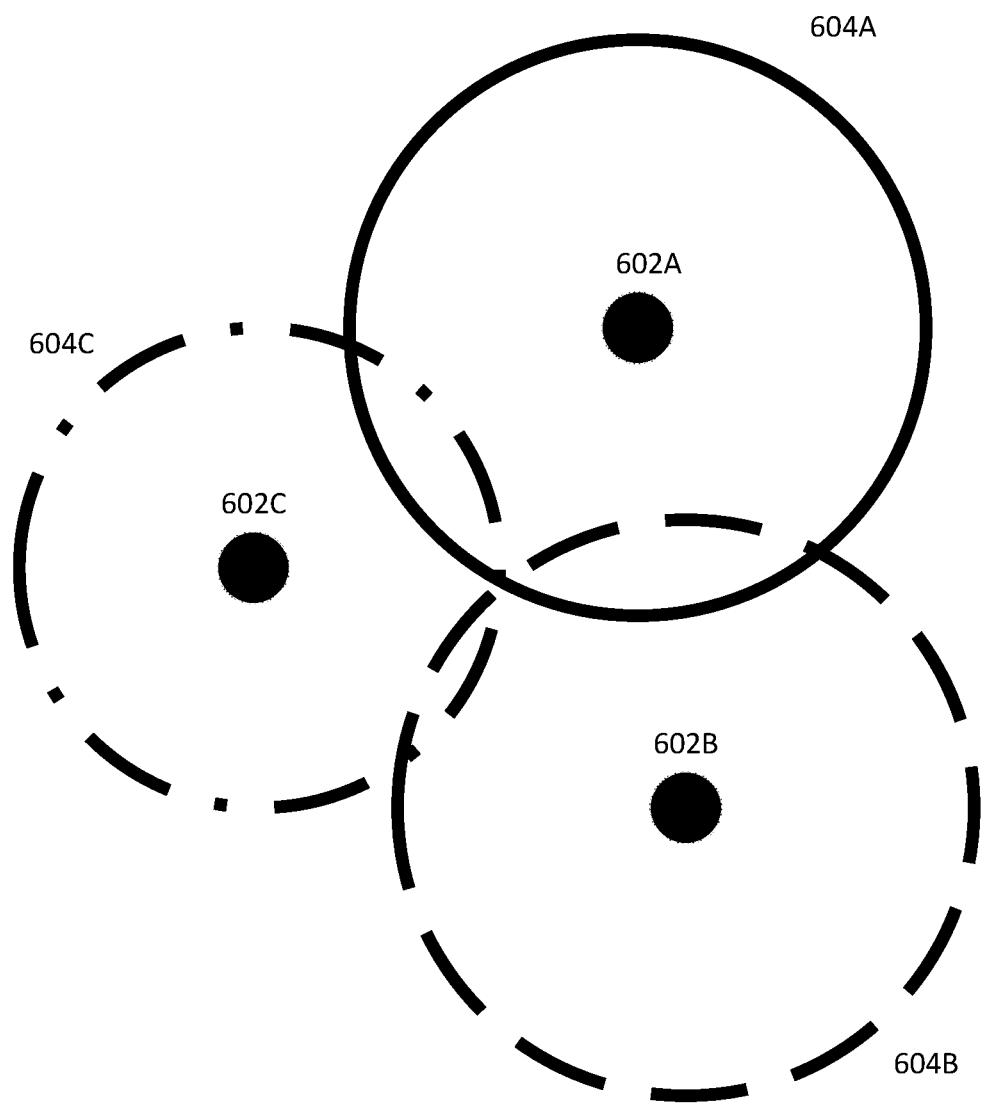
FIG. 6 is an illustration of trilateration operation of the tracker, according to one embodiment.

FIG. 6 is an illustration of trilateration operation of the tracker, according to one embodiment. The towers 602A-C emit a signal 604A-C of known strength, containing information about from which tower it comes from. The signal strength may be adjustable in some embodiments. The tracker 606 receives these signals 604 from the towers 602 and uses the signal strength from each tower 602 to find the exact location (where all three signal "circles" intersect). The towers signal transmission methodology is conventional. AGPS also uses trilateration but using cell towers instead of towers 602. The cell towers serve the same purpose as the towers 602, with their signal 604 being received by the tracker 606 and using the signal strengths to find the location. With AGPS, the position is further pinpointed by using GPS after the trilateration.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of embodiments. This description should be read to include one or at least one and the singular also includes the plural unless it is obvious that it is meant otherwise. The use of the term and/or is intended to mean any of: "both", "and", or "or."

In addition, the language used in the specification has been principally selected for readability and instructional purposes and may not have been selected to delineate or circumscribe the inventive subject matter. Accordingly, the disclosure of the embodiments is intended to be illustrative, but not limiting, of the scope of the embodiments.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments.

What is claimed is:

1. A method for tracking a first object having an attached first tracking device comprising the steps of:
   receiving a request for a first location representing a location of the first tracking device;
   determining that the first tracking device is within tower range when the first tracking device receives first, second and third tower signals that have signal strengths that are greater than a first threshold;
   determining that the first tracking device is located outside of tower range when first tracking device does not receive first, second and third tower signals that have signal strengths that are not greater than the first threshold;
   determining the location of the first tracking device when the first tracking device within tower range having the steps of:
      receiving said first, second and third tower signals,
      determining the signal strength of said first, second and third tower signals,
      determining the location of the first tracking device using trilateration based upon the signal strength values of said first, second and third tower signals; and determining the location of the first tracking device when the first tracking device is located outside of tower range having the steps of:
  receiving AGPS signals; and
  determining the location of the first tracking device based upon the signal strength values of said AGPS signals.

2. The method of claim 1, wherein the first object is glasses.

3. The method of claim 2, wherein the first tracking device is positioned on one of the frame, temple or temple tips of said glasses.

4. The method of claim 3, wherein the first tracking device has an elongated shape of fit on one of the frame, temple or temple tips of said glasses.

5. The method of claim 1, further comprising the step of:
recharging a battery in said first tracking device using solar cells positioned on an external side of the first tracking device.

6. The method of claim 1, wherein said first tracking device is water resistant.

7. The method of claim 1, wherein said step of determining the location of the first tracking device when the first tracking device is within tower range further comprises transmitting signal strength values of said first, second and third tower signals to a remote computing device.

8. The method of claim 1, wherein said step of determining the location of the first tracking device when the first tracking device is located outside of tower range further comprises the step of transmitting said AGPS signals to a remote computing device.

9. The method of claim 1, further comprising the step of displaying the location of the first tracking device.

10. The method of claim 1, further comprising the step of displaying the location of the first tracking device over a range of times during a first period.

11. The method of claim 1, further comprising the step of displaying the location of the first tracking device at a first time during a first period.

12. The method of claim 1, wherein said first object is a person.

13. The method of claim 1, wherein the step of determining that the first tracking device is located within tower range and the step of determining that the first tracking device is located outside of tower range is a single step based on whether the first, second and third tower signals have signal strengths that are greater than or not greater than said first threshold.

14. The method of claim 1, further comprising the step of tracking a second object having an attached second tracking device having the steps of:
  receiving a request for a second location representing a location of the second tracking device;
  determining that the second tracking device is located within tower range when the second tracking device receives first, second and third tower signals that have signal strengths that are greater than a first threshold;
  determining that the second tracking device is located outside of tower range when the second tracking device does not receive first, second and third tower signals that have signal strengths that are not greater than the first threshold;
  determining the location of the second tracking device when the second tracking device is located within tower range having the steps of:
    receiving said first, second and third tower signals,
    determining the signal strength of said first, second and third tower signals,
    determining the location of the second tracking device using trilateration based upon the signal strength values of said first, second and third tower signals; and
  determining the location of the second tracking device when the second tracking device is located outside of tower range having the steps of:
    receiving AGPS signals; and
    determining the location of the second tracking device based upon the signal strength values of said AGPS signals.

15. A first tracking device for tracking a first object comprising:
  a receiving unit for receiving a request for a first location representing a location of the first tracking device, said first tracking device attached to the first object;
  a location determining unit for
    determining that the first tracking device is located within tower range when the first tracking device receives first, second and third tower signals that are greater than a first threshold;
    determining that the first tracking device is located outside of tower range when the first tracking device does not receive first, second and third tower signals that are greater than the first threshold;
    determining the location of the first tracking device when the first tracking device is located within tower range having the steps of:
      receiving said first, second and third tower signals,
      determining the signal strength of said first, second and third tower signals,
      determining the location of the first tracking device using trilateration based upon the signal strength values of said first, second and third tower signals; and
    determining the location of the first tracking device when the first tracking device is located outside of tower range having the steps of:
      receiving AGPS signals; and
      determining the location of the first tracking device based upon the signal strength values of said AGPS signals.

16. The first tracking device of claim 15, further comprising: a transmitting unit for transmitting values of said first, second and third tower signals to a remote computing device.

17. The first tracking device of claim 16, further comprising:
solar cells for recharging a battery in said first tracking device, said solar cells positioned on an external side of the first tracking device.

18. The first tracking device of claim 15,
wherein the first object is glasses;
wherein the first tracking device is positioned on one of the frame, temple or temple tips of said glasses; and
wherein the first tracking device has an elongated shape of fit on one of the frame, temple or temple tips of said glasses.

19. The first tracking device of claim 15, further comprising memory for storing the position of the first tracking device over a range of time during a first period.

20. The first tracking device of claim 15, wherein said first object is a person.

* * * * *